Feb. 22, 1966 H. D. FRYE ETAL 3,236,619
GLASS TUBE FORMING APPARATUS
Filed Jan. 11, 1962 3 Sheets-Sheet 1

INVENTORS
H. D. FRYE &
BY F. D. PINOTTI
E. J. HOLLER &
W. A. SCHAICH
ATTORNEYS

Feb. 22, 1966 H. D. FRYE ETAL 3,236,619
GLASS TUBE FORMING APPARATUS
Filed Jan. 11, 1962 3 Sheets-Sheet 3

INVENTORS
H. D. FRYE &
BY F. D. PINOTTI
E. J. HOLLER &
W. A. SCHAICH
ATTORNEYS

United States Patent Office 3,236,619
Patented Feb. 22, 1966

3,236,619
GLASS TUBE FORMING APPARATUS
Harry D. Frye, Vineland, N.J., and Fred D. Pinotti, Toledo, Ohio, assignors, by mesne assignments, to Owens-Illinois Glass Company, Toledo, Ohio, a corporation of Ohio
Filed Jan. 11, 1962, Ser. No. 165,536
3 Claims. (Cl. 65—184)

This invention relates to improvements in method and apparatus for continuously drawing rod, tubing, or the like of glass or other thermoplastic material. The invention pertains to novel method and apparatus for producing high-quality tubing and rod of prescribed dimensions having improved physical characteristics, and more specifically, to a rotatable cylindrical forming mandrel for drawing lengthy glass products having greater dimensional stability and improved surface characteristics.

The present invention is especially adapted for use in conjunction with apparatus such as that disclosed in Patent No. 1,219,709 to Danner, issued March 20, 1917, entitled "Apparatus for Forming Molten Material in Cylindrical Form." In such apparatus a supply stream of molten glass flows downwardly onto a continuously rotating downwardly-inclined tapered mandrel and either solid rod or hollow tubing is continuously drawn from the lower or discharge end of the mandrel. The working portion of the mandrel as well as the flowing supply stream and deposited glass surrounding the working portion of the mandrel are all enclosed in a heated chamber or muffle to control glass temperatures to obtain a uniform product.

Conventionally in the manufacture of glass rod or tubing as practiced by the Danner process, a tubular refractory sleeve is mounted on a metallic blowpipe which serves to permit the molten glass to flow thereon due to the rotation of the mandrel as well as the action of gravity in combination with lengthwise drawing of the material therefrom in a substantially horizontal direction. In the making of tubing the mandrel discharge end has a perforated tip which is employed as a blowpipe and in the making of rod, an imperforate tip is utilized having a conical shape at its lower extremity. Whether the nosepiece be fabricated of metal or refractory material such as fireclay, in virtually all forms of the Danner process the major exterior surfaces of the body portion of the mandrel have been comprised of inorganic refractory material such as a cast sleeve of fireclay.

Previously it has been observed that when molten glass passes over such sleeve, outgassing of the refractory material which comprises the mandrel exterior surfaces has been found to cause the formation of small open blisters on and in the glass in contact with the sleeve. As this glas passes over the discharge end of the sleeve and is drawn distendingly therefrom in catenary form, these blisters tend to become elongated and form open so-called "air-lines." Such defects or the occurrence of any incipient devitrification in drawn tubing makes the same objectionable for use as syringe cartridges, culture tubes, etc., which are normally fabricated from lengths of high-quality tubing. Also during a long-term campaign of forming a single tubular product, for example, having precisely-controlled internal and external diameters and truly cylindrical configuration, it has been observed that non-uniform wear of the mandrel refractory sleeve can cause both dimensional and shape variations in the product which must be corrected by modifying other variables where possible or by replacing the refractory sleeve. Such replacement involves a time-consuming operation, particularly in re-establishing proper thermally-balanced conditions within the muffle chamber.

In the utilization of a cylindrical forming mandrel having an oxidation-resistant metallic sleeve such as one comprised of noble metal alloy overlying a refractory clay body portion, heretofore it has been extremely difficult of attainment due to dissimilar expansivities of the materials involved to maintain the sleeve in precise coaxial alignment throughout extensive drawing campaigns. The present invention is directed to providing drawing mechanism and method of drawing for fabricating improved glass products.

Accordingly, it is an object of the present invention to overcome the above-noted deficiencies in glass drawing operations by the provision of a rotary forming mandrel having substantially imperforate exterior surfaces throughout its working region which are comprised of precious or noble metal or alloys thereof and which is capable of continuous axial alignment at elevated temperatures to achieve dimensional stability in drawn products.

Another object of this invention is to provide combined apparatus which includes a novel rotary forming mandrel for utilization in continuously forming molten thermoplastic material into lengthy cylindrical configuration having improved physical characteristics, said mandrel having a refractory body portion and noble metal external sleeve portion adapted to continued maintenance in concentric relation with the body portion of the mandrel.

Another object of this invention is to provide both apparatus and method for continuously drawing molten glass into various lengthy cylindrical products by the use of a rotatable forming mandrel having noble metal exterior forming surfaces throughout its working region which surfaces are thermally controlled and maintained in continuous concentric alignment with the body portion of the mandrel A further object of this invention is to provide apparatus for continuously drawing molten glass into lengthy rod or tubing having improved physical characteristics, said apparatus comprising a downwardly-inclined rotating mandrel having a refractory body portion and glass-working external surfaces which are comprised of noble metal, means for maintaining said noble metal external surfaces in continuous concentric alignment with the body portion at various elevated temperatures, and means for internally heating at least the discharge end region of said noble metal external surfaces to maintain the same in precisely controlled thermal condition for drawing operations.

A still further object of this invention is to provide combined apparatus for drawing various sizes of glass products as required all having lengthy dimensionally-controlled cylindrical configuration, said apparatus comprising a unitary forming mandrel which has imperforate noble metal external surfaces extending throughout the glass-contacting region of said mandrel, an electrical heating element mounted beneath the glass-working region adjacent the discharge end of the mandrel to facilitate its thermal control, and complementally flaring areas beyond the glass-contacting region for maintaining the noble metal external surfaces in precise concentricity with the mandrel body portion during long-term drawing operations.

The specific nature of this invention, as well as other objects and advantages thereof, will become apparent to those skilled in the art from the following detailed description, taken in conjunction with the annexed sheets of drawings on which by way of preferred example only, are the preferred examples of this invention.

Figure 4:
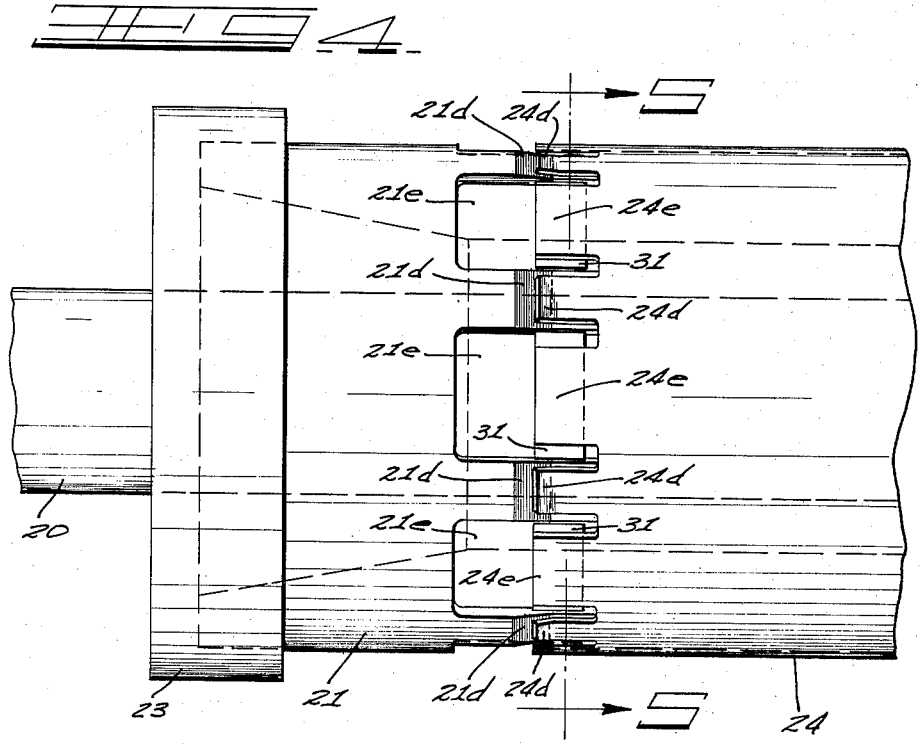
FIG. 4 is a further enlarged side elevational view of one portion of the subject forming mandrel illustrating its construction immediately above and beyond its glass-contacting region.
Figure 5:
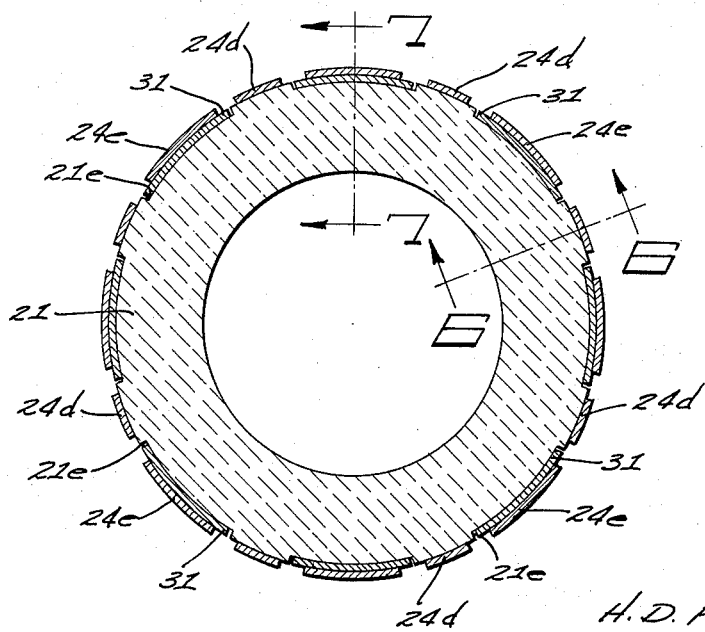

FIG. 5 is a vertical sectional view of the mandrel taken along the line 5—5 of FIG. 4; and FIGS. 6 and 7 are further enlarged vertical sectional views taken along the lines 6—6 and 7—7 of FIG. 5 respectively.

The present invention is particularly well adapted for use with the invention disclosed in the above-identified patent to Danner. The attached drawings illustrate a preferred form of novel apparatus incorporated therein to accomplish the purposes and objectives set forth hereinabove. The subject apparatus and method are also applicable for use with other processes and apparatus wherein various diverse types of lengthy glass products are formed by drawing molten glass downwardly or upwardly from the discharge end of a stationary or rotating forming mandrel. Glassware made in accordance with the invention exhibits features of dimensional stability and improved surface characteristics which properties are particularly desirable in a continuously drawn glass product.

Figure 1:
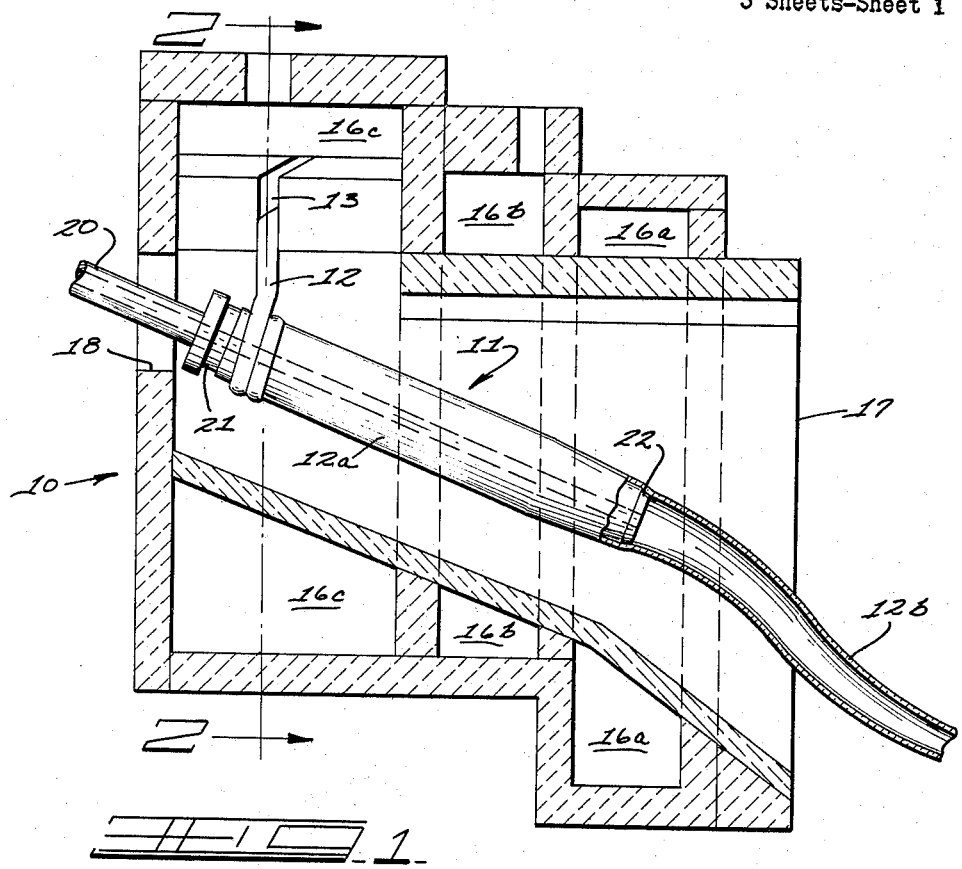
FIG. 1 is a vertical sectional view illustrating a rotatable forming mandrel in one embodiment of the present invention incorporated in conventional drawing apparatus.
Figure 2:
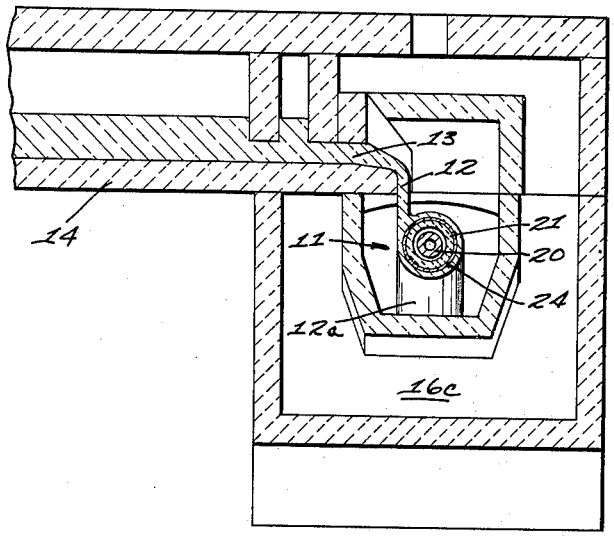
FIG. 2 is a vertical sectional view of reduced proportions taken along the line 2—2 of FIG. 1.

In accordance with FIG. 1, muffle or chamber 10 encloses the usual downwardly-inclined mandrel 11 upon the external surface of which molten glass flows, being delivered thereonto in the form of a supply stream 12 from a delivery trough 13 positioned at the terminating end of a furnace forehearth 14. Obviously, the above-described elements can be varied widely as known in the art and may or may not be comprised of conventional structures.

Molten glass stream 12 is continuously deposited on rotating mandrel 11 and smoothly flows over its essentially cylindrical surfaces initially in a helical and a cylindrical pattern and subsequently in a frusto-conical pattern. The glass is drawn in a constricting manner in catenary form from the discharge end of mandrel 11 at prescribed rates into a lengthy cylindrical product comprising rod or tubing as set forth hereinbelow.

Forming chamber or muffle 10 is fabricated or lined with refractory material and is surrounded by a plurality of annular heating chambers 16a, 16b, and 16c, which contain gas flames and/or products of combustion of burner fires to maintain elevated temperatures within the chamber. Alternately, muffle 10 is surrounded by a single plenum chamber which serves to contain the burner fires for heating the glass-forming inner chamber containing rotary mandrel 11.

The discharge end 17 of the muffle from which the glass product is drawn may be generally open as shown or essentially fully-enclosed except for a relatively small opening through which the glass product is drawn.

Mandrel 11 is mounted in downwardly-inclined cantilevered relation projecting through an opening 18 in the muffle chamber. The mandrel is rotatingly mounted exteriorly of the chamber and driven at a uniform rate of rotation by any one of various types of known conventional driving apparatus such as an electric motor and gear reduction box or the mechanism shown in the Danner patent.

Central blowpipe or body portion 20 of the mandrel which is normally fabricated of heat-resistant metal projects within the heated chamber and is surrounded by a lengthy cylindrical-shaped refractory member 21 having a slightly tapering lower extremity. The terminating end 22 of the mandrel may be provided with an axial opening to facilitate controlling internal pressure in drawing regular or capillary tubing, or a conically-shaped nosepiece (not shown) having imperforate surfaces may be employed to draw solid rod or cane therefrom. Such nosepiece is disclosed in the copending patent application of Green and Walk, Serial No. 128,204, filed July 31, 1961, entitled "Apparatus and Method for Forming Molten Glass in Cylindrical Form" which application is assigned to a common assignee. As shown in FIG. 1 molten glass 12 is deposited on the mandrel having a frusto-conical end portion with an axial opening and the product is drawn therefrom in the form of tubing 12b.

Figure 3:
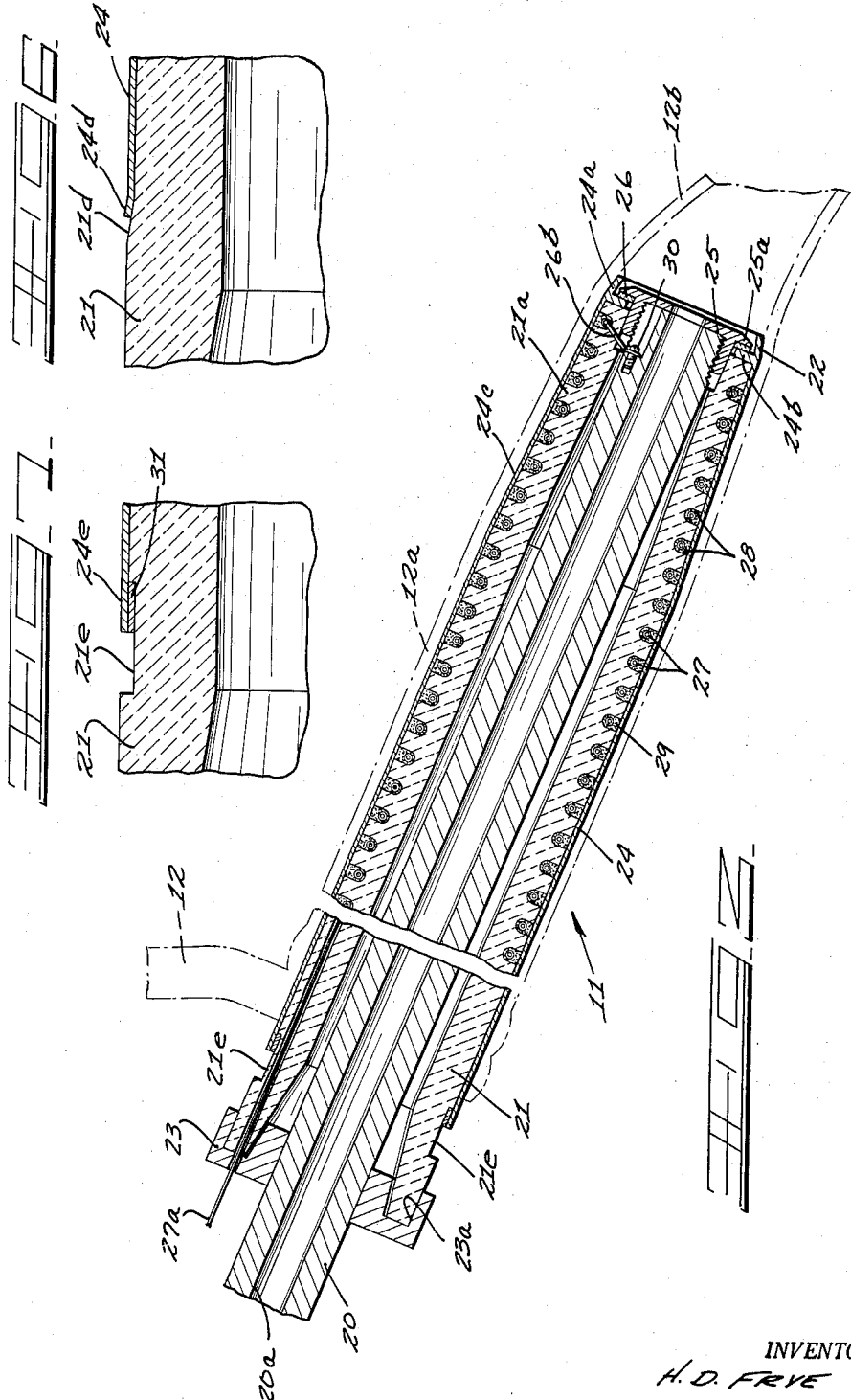
FIG. 3 is an enlarged vertical sectional view of the rotatable forming mandrel only fabricated in accordance with the present invention.

As shown in FIG. 3, mandrel 11 consists essentially of a blowpipe member 20 which is essentially a rigid tubular shaft having an axial opening 20a extending throughout its length. Cylindrical refractory sleeve member 21 having a slightly tapering end portion 21a is mounted on the blowpipe member 20. A metallic ring 23 is rigidly attached to an intermediate region of blowpipe member 20 having an annular recess 23a therein adapted to receive and retain the complementally-contoured upper end of refractory intermediate sleeve 21 in coaxial alignment with blowpipe member 20. A cylindrical external sleeve member 24 comprised of precious or noble metal such as platinum, rhodium, or their alloys, for example, is mounted on refractory intermediate member 21.

Sleeve 24 is preferably fabricated of noble metal such as an alloy comprised of 90% platinum and 10% rhodium by weight. External sleeve member 24 has an internal contour which is closely complemental to the exterior surfaces of intermediate refractory member 21 throughout its contacted length. The terminating end 24a of external sleeve 24 has an L-shaped cross-sectional contour with sufficiently heavy wall thicknesses to maintain its shape at the working temperatures of the thermoplastic material, including high-melting glass such as borosilicates and aluminosilicates. The inwardly-projecting leg or flange 24b of the L-shaped end portion of the noble metal sleeve is held firmly in place against the lower terminating edge of intermediate refractory member 21. The longitudinally-projecting sleeve end portion 24a provides converging frusto-conical surfaces which facilitate smooth departure of the glass from the mandrel discharge end.

A bushing member 25 which is threaded onto the lower extremity of mandrel body portion 20 has an exteriorly-projecting flange 25a to retain noble metal sleeve 24 in positive engagement with intermediate refractory member 21 at the discharge end of the mandrel. An annular ring 26 of electrically-insulating material such as asbestos is disposed between the exteriorly-projecting retention flange 25a of the bushing and the inwardly-projecting flange 24b of the external sleeve. With bushing 25 turned tightly onto blowpipe member 20, its flange portion retains the assembly including the intermediate refractory member 21 and the lower end portion of noble metal sleeve 24a as a rigid integral unit. Metallic external sleeve 24 is maintained electrically insulated from an internal heating element 27 by the use of insulating ring 26 to avoid shorting out of the heating element and non-uniform temperature distribution beneath the external sleeve.

Intermediate refractory member 21 is provided with a spiral-shaped recess 28 which extends substantially throughout the entire working region of the mandrel and particularly throughout its discharge end portion. Recess 28 has an essentially uniform depth and spacing of its helical turns for mounting the spirally-wound heating element 27 therewithin.

The helical-shaped heating element 27 of the resistance-type is mounted within spiral recess 28 with its turns spaced an essentially uniform distance beneath the internal surface of external noble metal sleeve 24 and out of electrical contact therewith. Heating 27 is retained permanently in place within the spiral recess by a surrounding layer 29 of refractory material such as Alundum cement, which fills the recess and maintains element 27 separated from noble metal sleeve 24. The heating element is preferably comprised of a noble metal alloy such as 80% platinum and 20% rhodium by weight.

The upper end 27a of the heating element extends longitudinally through a suitable opening in intermediate refractory member 21 and through retention bushing 23 being maintained electrically insulated therefrom. This end of the heating element is then interconnected with a suitable commutator electrode to supply electrical energy to its upper end. The end 26b of the heating element is connected internally to a region adjacent the lower extremity of metallic blowpipe 20 by a suitable machine screw 30. Blowpipe 20 thus provides the other connection for supplying electrical energy to resistance-type heating element 27.

When a prescribed amount of electrical current is supplied to heating element 27, the temperature level of external surfaces of noble metal sleeve 24 is controlled to provide an elevated temperature sufficiently high to prevent devitrification of the glass product in contact with the mandrel exterior surfaces. In drawing certain types of conventional glasses such as soda-lime and borosilicates into tubular products, the exterior surfaces 24c of noble metal sleeve 24 particularly throughout an extended region at the mandrel discharge end should be maintained within a temperature range of about 2100 to 2400° F.

The upper end of noble metal external sleeve 24 has a series of axially-extending tabs or flanges 24d and 24e to facilitate maintaining the external sleeve in continuous concentric alignment with refractory intermediate member 21. Flanges 24d and 24e which are formed at the upper end of the noble metal sleeve are disposed in alternating arrangement spaced-apart by a series of longitudinal grooves. Each of the flanges or tabs 24d has a slightly flaring cross-sectional contour to facilitate its slidable engagement with a complementally-flared surface 21d of refractory member 21. The series of outwardly-tapering flanges or tabs 24d extend throughout the full circumference of the sleeve member spaced alternately between wider flanges 24e. Flanges 24e each have a noble metal insert member 31 affixed thereto, such as by welding, and each is disposed within a slightly larger recess 21e formed in spaced-apart relation within the exterior surface of intermediate refractory member 21. FIGS. 4 and 5 illustrate the alternating relationship of the several types of flanges 24d and 24e provided at the upper end of the noble metal sleeve. As shown therein, upon thermal expansion and contraction of the noble metal sleeve at different rates from those exhibited by the supporting refractory material, the external sleeve is maintained in precise concentricity therewith throughout elevated operating temperatures. The insert members 31 which are rigidly attached to flanges 24e are capable of axial movement upon expansion and contraction of the noble metal sleeve member with respect to the intermediate refractory member. These elements serve to prevent angular rotation of the sleeve with respect to the refractory member during concurrent rotation thereof. Thus, these members are held in firm engagement for their positive rotation as an integral unit. Insert members 31 are capable of axial movement within recesses 21e during differential rates of expansion and contraction of the component parts of the mandrel. At this time flanges 24d are capable of movement in an axial direction on tapering surfaces 21d with both members being continuously retained in coaxial alignment. FIGS. 6 and 7 illustrate the manner of movement of the several flange types during operation of the subject mandrel.

Drawing of a cylindrical glass product in accordance with the present invention may be summarily described as follows:

With mandrel 11 mounted in downwardly-inclined fully-assembled relation, a supply stream 12 of molten glass is deposited on an upper cylindrical portion of external noble metal sleeve 24. The glass is deposited on the external sleeve at a region below the above-described upper end flange construction which facilitates its being maintained in precise coaxial alignment with the mandrel blowpipe. The glass flows downwardly onto and around the mandrel during rotation as a workable body 21a and is drawn from the mandrel lengthwise either in tubular or rod-like form having a basically cylindrical configuration. In drawing a solid glass product a mandrel nosepiece having a conical shape with imperforate surfaces is employed. In drawing various sizes of tubing the end of the mandrel consists of a conical region having an axial opening to control the atmosphere within the tubular product as drawn. In making capillary tubing, for example, less than atmospheric pressure is employed in drawing such product and in making regular tubing, the atmosphere internally of the tube is maintained slightly greater than atmospheric by introducing low-pressure blowing air. In the present method the mandrel is provided with imperforate noble metal surfaces throughout its glass-contacting region, such surfaces being comprised of platinum, rhodium, gold, silver, palladium, iridium, ruthenium, osmium, or alloys thereof. The external noble metal surfaces are maintained at an elevated temperature by an internal heating element to minimize devitrification of the glass as drawn. The noble metal forming surfaces are not subject to outgassing on prolonged use to cause defects in the drawn products. In accordance with the present method the external sleeve member is continuously maintained in coaxial alignment with the mandrel body member throughout the temperature range of glass drawing. The external sleeve is constructed in such manner as to allow for expansion and contraction lengthwise of its complementally-flared upper portion over the refractory support member. In the subject method the temperature of discharge end of the noble metal sleeve is controlled within precise thermal limits by internal heating which may be utilized as required depending upon the particular material being drawn and the characteristics of the products being formed.

Obviously, various sizes of rod and tubing are capable of being drawn in accordance with the present method by careful control of other known variants such as the angle of inclination of the mandrel, glass temperatures and composition, and atmospheric temperatures within the muffle chamber as well as drawing rates.

Various modifications may be resorted to within the spirit and scope of the appended claims.

We claim:
1. A rotatable cylindrical forming member for drawing molten glass into lengthy cylindrical form comprising
   a blowpipe member having an axial opening and a free end,
   a heat-resistant refractory intermediate body member surrounding at least a portion of said blowpipe member,
   an external sleeve member surrounding at least a portion of said body member,
   means on the free end of said blowpipe member for supporting the adjacent end of said body member in spaced relation to said blowpipe member and fixedly supporting the adjacent end of the sleeve member relative to said blowpipe,
   engaging means on the other end of said sleeve member,
   complementary interengaging means on the body member engaged by said engaging means for supporting the other end of said sleeve member on said body member for movement longitudinally and radially relative to said body member to acommodate differential expansion between said body member and said sleeve member.

2. The combination set forth in claim 1 wherein said engaging means on said sleeve member comprising an annular series of spaced outwardly flaring tab elements on said sleeve member, said complementary means on said body member comprising complementary flared contiguous surface areas engaged by said flaring tab elements to maintain said body member and said sleeve member in continuous co-axial alignment.

3. The combination set forth in claim 1 including a helical electrical heating element disposed within the body member of said mandrel extending beneath the discharge end of said sleeve member, means for supplying electrical energy to said heating element, and means for insulating said sleeve member from said heating element.

References Cited by the Examiner

UNITED STATES PATENTS

| | | | |
|---|---|---|---|
| 1,218,598 | 3/1917 | Danner | 65—89 |
| 1,637,458 | 8/1927 | Schoonenberg | 65—89 |
| 1,977,956 | 10/1934 | Soubier | 65—89 |
| 2,106,527 | 1/1938 | Hostetter | 65—374 |
| 2,402,924 | 6/1946 | Snyder | 65—356 |
| 2,803,925 | 8/1957 | Klausmann | 65—374 |
| 2,972,837 | 2/1961 | Pinotti | 65—184 |

DONALL H. SYLVESTER, *Primary Examiner.*